United States Patent [19]

Henry, Jr.

[11] 3,917,466

[45] Nov. 4, 1975

[54] COMPOSITIONS OF OLEFIN-SULFUR DIOXIDE COPOLYMERS AND POLYAMINES AS ANTISTATIC ADDITIVES FOR HYDROCARBON FUELS

[75] Inventor: Cyrus Pershing Henry, Jr., Penns Grove, N.J.

[73] Assignee: E. I. Du Pont de Nemours & Co., Wilmington, Del.

[22] Filed: Oct. 29, 1974

[21] Appl. No.: 518,527

[52] U.S. Cl. ............................................. 44/62; 44/72
[51] Int. Cl.² .................................................. C10L 1/22
[58] Field of Search .................................. 44/62, 72

[56] References Cited
UNITED STATES PATENTS

| | | | |
|---|---|---|---|
| 2,853,373 | 9/1958 | Stuart | 44/62 |
| 3,017,258 | 1/1962 | Pollitzer | 44/72 |
| 3,189,652 | 6/1965 | Pollitzer | 260/584 |
| 3,811,848 | 5/1974 | Johnson | 44/62 |
| 3,820,963 | 6/1974 | Moore et al. | 44/62 |

*Primary Examiner*—Daniel E. Wyman
*Assistant Examiner*—Y. H. Smith
*Attorney, Agent, or Firm*—James A. Costello

[57] ABSTRACT

Antistatic additive compositions for hydrocarbon fuels, the compositions comprising olefin-sulfur dioxide copolymers in combination with polymeric polyamines.

14 Claims, No Drawings

COMPOSITIONS OF OLEFIN-SULFUR DIOXIDE COPOLYMERS AND POLYAMINES AS ANTISTATIC ADDITIVES FOR HYDROCARBON FUELS

BACKGROUND OF THE INVENTION

1. Field of the Invention

This invention concerns an improved two-component antistatic additive for hydrocarbon fuels to render them electrically conductive. One component is an olefin-sulfur dioxide copolymer (polysulfone copolymer) and the other component is a particular polymeric polyamide.

2. Description of the Prior Art

Hydrocarbon fuels normally are very poor conductors of electricity. Electrical charges, therefore, tend to accumulate in the fuel and can be discharged as sparks thus creating the danger of an explosion or fire should such charges ignite hydrocarbon-air admixtures that may be present.

Numerous materials have been suggested in the art to increase the electrical conductivity of hydrocarbon fuels. Suggested materials include two-component additives where one component is a polysulfone and the other is a quaternary ammonium compound. See U.S. Pat. No. 3,811,848. Another suggested two-component additive comprises polysulfone as one component and polyvalent metal organic compounds of metals having an atomic number of from 22 to 29 as the other component. See U.S. Pat. No. 3,807,977.

SUMMARY OF THE INVENTION

The improved two-component antistatic additives of this invention are characterized by being highly effective at low levels of usage and by being ashless upon burning. These improved two-component antistatic additives are so efficient that even at relatively low concentrations they provide the desired conductivity (measured in picomhos per meter) in nearly all hydrocarbon fuels.

In the improved antistatic additive of this invention wherein the components are present in a weight ratio of 100:1 to 1:100, and wherein one component is a polysulfone copolymer consisting essentially of about 50 mol percent of units from sulfur dioxide, about 40 to 50 mol percent of units derived from one or more 1-alkenes each having from about 6 to 24 carbon atoms, and from about 0 to 10 mol percent of units derived from an olefinic compound having the formula ACH=CHB wherein A is a group having the formula —$(C_xH_{2x})$—COOH wherein $x$ is from 0 to about 17, and B is hydrogen or carboxyl, with the proviso that when B is carboxyl, $x$ is 0, and wherein A and B together can be a dicarboxylic anhydride group, the improvement comprises, in combination with said polysulfone component, a polymeric polyamide of the formula

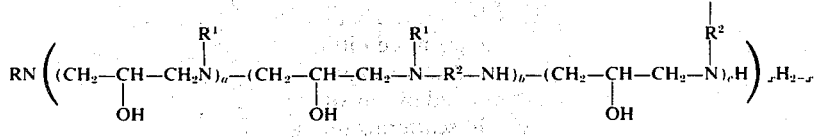

wherein $R^1$ is an aliphatic hydrocarbyl group of 8 to 24 carbon atoms,
$R^2$ is an alkylene group of 2 to 6 carbon atoms,
R is $R^1$, or, an N-aliphatic hydrocarbyl alkylene group of the formula $R^1NHR^2$,
$a$ is an integer of 0 to 20,
$b$ is an integer of 0 to 20,
$c$ is an integer of 0 to 20, and
$x$ is an integer of 1 to 2,
with the proviso that when R is $R^1$ then $a$ is an integer of 2 to 20 and $b=c=o$, and when R is $R^1NH—R^2$ then $a$ is 0 and $b + c$ is an integer of 2 to 20.

Preferred embodiments of this invention are those wherein the polysulfone is composed solely of units derived from sulfur dioxide and units derived from at least one 1-alkene of from 8 to 12 carbon atoms. An especially preferred embodiment is that wherein the 1-alkene is 1-decene.

A preferred embodiment, with reference to the polyamine component, is that where $R=R^1$, wherein $R^1$ is an aliphatic hydrocarbyl group of 12 to 18 carbon atoms, especially where $R^1$ is the aliphatic hydrocarbyl group of tallowamine.

Also preferred, with reference to the polyamine component, are embodiments where R is $R^1NHR^2$, wherein $R^1$ is an aliphatic hydrocarbyl group of 12 to 18 carbon atoms and $R^2$ is an alkylene group of 3 carbon atoms, especially where $R^1$ is the aliphatic hydrocarbyl group of tallowamine.

The most preferred polysulfone copolymer of the invention is 1-decene polysulfone having an inherent viscosity in the range of from about 0.1 dl/g to 1.6 dl/g (M.W. of 50,000 to 900,000) and the most preferred polymeric polyamine is the polymeric 1:1.5 mol ratio reaction product of N-tallow-1,3-diaminopropane with epichlorohydrin,

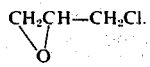

The weight ratio of polysulfone copolymer to polymeric polyamine in the invention composition ranges from 100:1 to 1:100, preferably from about 50:1 to 1:1, and most preferably from about 20:1 to 1:1.

This invention also concerns the two-component additive as heretofore described together with a strong acid (oil-soluble sulfonic acid is preferred). Thus, a polyamine-sulfonic acid salt will be formed which has an improved resistance to precipitate-formation during long storage periods. This invention also concerns the additives in concentrate form in a solvent therefor. A preferred composition containing the antistatic additive, an acid to enhance precipitate-free storability, and a solvent, comprises, based on total weight:
 i. from about 5 to 25 percent of the polysulfone,
 ii. from about 5 to 25 percent of the polymeric polyamine,
 iii. from about 5 to 30 percent of oil-soluble sulfonic acid, and iv. from about 20 to 85 percent of solvent.

The preferred sulfonic acid (iii) is dodecylbenzenesulfonic acid.

This invention also concerns a composition comprising a liquid hydrocarbon fuel boiling in the range of from about 20° to 375°C., and from about 0.01 ppm to 40 ppm of the two-component polysulfone-polyamine antistatic additive composition described herein. Although more than 40 ppm of the additive can be used, no significant benefit is thereby derived.

Certain coadditives which are known to provide good initial electrical conductivity in cooperation with the polysulfone copolymer component can also be included in the present invention composition. Included are quaternary ammonium compounds which are more fully described in coassigned U.S. Pat. No. 3,811,848.

It has been found that improved three-component antistatic compositions can be obtained by combining the polymeric polyamine described herein with a two-component antistatic additive comprising:

a polysulfone copolymer consisting essentially of about 50 mol percent of units derived from sulfur dioxide, from about 40 to 50 mol percent of units derived from 1-alkene of 6 to 24 carbon atoms and from 0 to about 10 mol percent of units derived from an olefin having the formula

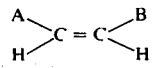

wherein

A is a group having the formula $-(C_xH_{2x})-COOH$ wherein $x$ is from 0 to about 17, and B is hydrogen or carboxyl, with the proviso that when B is carboxyl, $x$ is 0, and wherein A and B together can be a dicarboxylic anhydride group and a quaternary ammonium compound having the formula:

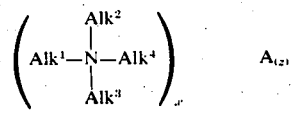

wherein

Alk$^1$ and Alk$^2$ are the same or different alkyl groups having from 1 to 22 carbon atoms, Alk$^3$ is selected from the group consisting of alkyl groups of 1 to 22 carbon atoms and

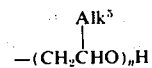

where Alk$^5$ is hydrogen or methyl and $n$ is 1 to 20, Alk$^4$ is selected from the group consisting of (a) an alkyl group having 1 to 22 carbon atoms, (b) an aralkyl group having from 7 to 22 carbon atoms, (c) a

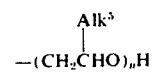

group as defined above, (d) a

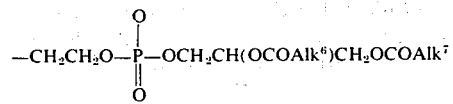

group wherein

Alk$^6$ and Alk$^7$ are the same or different alkyl groups having from 11 to 19 carbon atoms, and (e) an $-Alk^8-CO_2$ group wherein Alk$^8$ is a hydrocarbyl group having from 1 to 17 carbon atoms, with the proviso that when Alk$^1$, Alk$^2$, Alk$^3$ and Alk$^4$ are each alkyl groups, at least one of them is an alkyl group having at least 8 carbon atoms, A is an anion, $z$ is 0 or 1, $z$ is 0 when Alk$^4$ is (d) or (e), and $y$ is at least 1, $y$ is equal to the ionic valence of anion A when $z$ is 1.

The ratio of the components are such that for each part of polysulfone there is 0.01 to 100 parts of each of the polymeric polyamine and the quaternary ammonium compound.

The preferred quaternary ammonium compound is dicocodimethyl ammonium nitrite wherein "coco" refers to a mixture of $C_8$ to $C_{18}$ alkyl radicals of cocoamine. The quaternary ammonium compound is preferably present in the amounts of from about 1 part to 25 parts per 100 parts of polysulfone copolymer. The presence of a quaternary ammonium compound further enhances the electrical conductivity of the present invention composition in many hydrocarbon fuels and maintains the composition ash-free.

The term "hydrocarbyl" employed herein refers to straight and branched-chain groups containing only carbon and hydrogen. Such groups can be saturated or can have olefinic unsaturation.

DETAILS OF THE INVENTION

The Polysulfones

The polysulfone compolymers often designated as olefin-sulfur dioxide copolymer, olefin polysulfones, or poly(olefin sulfone) are linear polymers wherein the structure is considered to be that of alternating copolymers of the olefins and sulfur dioxide, having a one-to-one molar ratio of the comonomers with the olefins in head to tail arrangement. The polysulfones used in this invention are readiliy prepared by the methods known in the art (cf. Encyclopedia of Polymer Science and Technology Vol. 9, Interscience Publishers, page 460 et seq.).

The weight average molecular weights of the polysulfones are in the range from about 10,000 to 1,500,000, with the preferred range being from about 50,000 to 900,000, and the most preferred molecular weights being in the range of from about 100,000 to 500,000. Olefin polysulfones whose molecular weights are below about 10,000, while effective in increasing conductivity in hydrocarbon fuels, do not increase the conductivity values as much as olefin polysulfones of higher molecular weights. Olefin polysulfones whose molecular weights are above about 1,500,000 are difficult to produce and are more difficult to handle.

The molecular weights of the olefin polysulfones can be determined by any of the well-known methods, such as the light scattering method. It is generally more convenient, however, to determine the inherent viscosity of the polymer to derive the approximate molecular weight range of the polysulfones therefrom. Inherent viscosity is defined as $\eta_{inh.} = \ln.\eta_{rel}/C$ wherein ln is the natural logarithm, $\eta$ rel is a relative viscosity, i.e., ratio of the viscosity of the polymer solution to the viscosity of the polymer solvent and C is concentration of polymer g/100 ml. The units of inherent viscosity are deciliters per g (dl/g). The inherent viscosities of olefin polysulfones are conveniently measured in toluene at 30°C. as 0.5 weight percent solutions. It has been found by comparison with molecular weight determinations that polysulfones with inherent viscosities of between about 0.1 dl/g to 1.6 dl/g correspond to weight average molecular weights in the range of about 50,000 to 900,000.

The control of the molecular weights of the olefin polysulfones in the desired range is readily accomplished by those skilled in the art of polymer science by controlling the polymerization conditions such as the amount of initiator used, polymerization temperature and the like or by using molecular weight modifiers such as dodecyl mercaptan. The amount of molecular weight modifier required to obtain the desired molecular weight range will depend upon the particular 1-olefin being polymerized with sulfur dioxide, and can be determined easily with few experiments. Generally, the amount of modifier, such as dodecyl mercaptan, used to obtain the molecular weights in the range of 50,000 to 900,000 is in the range of up to about 0.007 mole per mole of 1-olefin.

The 1-alkenes useful for the preparation of the polysulfones are available commercially as pure or mixed olefins from petroleum cracking processes or from the polymerization of ethylene to a low degree. Included are 1-hexene, 1-heptane, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonodecene, 1-eicosene, 1-heneicosene, 1-docosene, 1-tricosene and 1-tetracosene. Although branched-chain alkenes are useful, the straight-chain 1-alkenes are preferred whether pure or in admixture with other straight-chain 1-alkenes.

When the polysulfone copolymer contains up to 10 mol percent of the olefin AHC=CHB, as defined above, A and B can together form a dicarboxylic anhydride group. The dicarboxylic anhydride group is readily converted to two carboxyl groups by simple acid hydrolysis. The olefin, AHC=CH$_2$, is a terminally unsaturated alkenoic acid represented by CH$_2$=CH—(C$_x$H$_{2x}$-)—COOH. The alkylene group bridging the vinyl and the carboxyl groups can have from 1 to 17 carbon atoms or it can be absent, and such alkylene group when present can be straight chain group or branched chain. The useful acids are alkenoic acids of 3 to 20 carbon atoms wherein the olefinic group is a terminal group. Representative but nonlimiting examples of alkenoic acids with a terminal olefinic group include acrylic acid, 3-butenoic acid, 4-pentenoic acid, 5-hexenoic acid, 6-heptenoic acid, 7-octenoic acid, 8-nonenoic acid, 9-decenoic acid, 10-undecenoic acid, 11-dodecenoic acid, 13-tetradecenoic acid, 15-hexadecenoic acid, 17-octadecenoic acid as well as branched chain alkenoic acids with terminal olefinic groups such as 2-ethyl-4-pentenoic acid, 2,2-dimethyl-4-pentenoic acid, 3-ethyl-6-heptenoic acid, 2-ethyl-6-heptenoic acid, 2,2-dimethyl-6-heptenoic acid and the like. It should be understood that a mixture of alkenoic acids can be used.

The reaction leading to polysulfone formation is the art-known free-radical polymerization process. Nearly all types of radical initiators are effective in initiating polysulfone formation. Radical initiators such as oxygen, ozonides, t-butylperoxypivalate, hydrogen peroxide, ascaridole, cumene peroxide, benzoyl peroxide, azobisisobutyronitrile are examples of some of the useful initiators. Free-radicals are generated from such radical initiators either thermally and/or by light activation in the presence of a mixture of sulfur dioxide and 1-alkene. The polymerization is preferably carried out in liquid phase, conveniently in a solvent such as benzene, toluene or xylene to facilitate the reaction. Such solvent can be removed, e.g., by distillation, if desired, but it is generally more convenient to use the polysulfone copolymer as a concentrate in such solvent. Generally, it is preferable to use an excess of sulfur dioxide since any unreacted sulfur dioxide is readily removed, as by passing nitrogen gas into the polymer solution. An excess of 1-alkene can be used, however, and the excess subsequently removed as by distillation.

The particular ratio of 1-alkene to sulfur dioxide appears to be immaterial since the resultant polysulfone copolymer contains 1-alkene and sulfur dioxide in 1:1 molar ratio regardless of the particular ratio used. However, for efficiency in utilization of the reactants and of the equipment, a slight excess of sulfur dioxide is preferred. The polymerization can be carried out at atmospheric or superatmospheric pressures, the polymerization reaction being independent of the pressure. The polymerization temperature can be any convenient temperature below the ceiling temperature of the particular 1-alkene employed. Ceiling temperature is the temperature at which the rates of polymerization and depolymerization are equal so that no polymer formation takes place. The above mentioned "Encyclopedia of Polymer Science and Technology" on page 466 lists ceiling temperatures for various 1-alkenes. Generally, the convenient polymerization temperature range is from about 0° to 50° C.

The Polymeric Polyamines

The polyamine component of the antistatic composition of the present invention is a polymeric reaction product of epichlorohydrin with an aliphatic primary monoamine or N-aliphatic hydrocarbyl alkylene diamine. The polymeric reaction products are prepared by heating an amine with eipchlorohydrin in the molar proportions of from 1:1–1.5 in the temperature range of 50° to 100°C. Generally, with aliphatic monoamines, R$^1$NH$_2$, the molar ratio is about 1:1. The initial reaction product is believed to be an addition product as illustrated below with a primary monoamine, R$^1$NH$_2$,

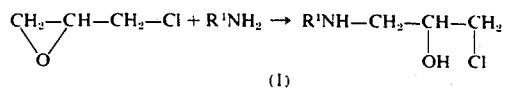

(I)

The aminochlorohydrin (I) upon reaction with an inorganic base then forms an aminoepoxide,

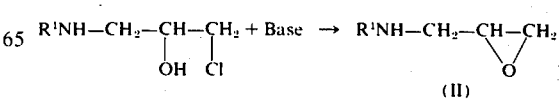

(II)

The aminoepoxide (II), which contains a reactive epoxide group and a reactive amino-hydrogen, undergoes polymerization to provide a polymeric material containing several amino groups. The ratio of epichlorohydrin to amine and the reaction temperature used are such that the polymeric reaction product contains from 2 to 20 recurring units derived from the aminoepoxide represented by II.

The polymeric reaction product derived from epichlorohydrin and an aliphatic primary monoamine as defined is represented by subgeneric formula (A),

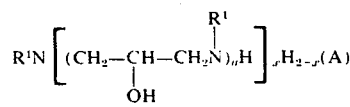

where $a$ is an integer from 2 to 20 and $x$ is an integer of 1 to 2.

The aliphatic primary monoamines that can be used to prepare the polymeric reaction products with epichlorohydrin can be straight chain or branched chain and include, inter alia, octylamine, nonylamine, decylamine, undecylamine, dodecylamine, tridecylamine, tetradecylamine, pentadecylamine, hexadecylamine, heptadecylamine, octadecylamine, nonadecylamine, eicosylamine, heneicosylamine, docosylamine, tricosylamine, tetracosylamine and the corresponding alkenyl analogs. The aliphatic primary amine should have at least about 8 carbon atoms, preferably about 12 to 18 carbon atoms to provide polymeric reaction products of sufficient solubility in hydrocarbon fuels. While aliphatic primary amines containing more than about 24 carbon atoms are useful, such amines are of limited availability.

Mixtures of aliphatic primary amines can also be used, and are preferred since mixtures of primary amines derived from tall oil, tallow, soybean oil, coconut oil, cotton seed oil and other oils of vegetable and animal origin are commercially available and at lower cost than individual amines. The above mixtures of amines generally contain alkyl and alkenyl amines of from about 12 to 18 carbon atoms, although sometimes an individual amine mixture, depending upon the source, contains small amounts of primary amines having fewer or more carbon atoms. A preferred example of a commercially available mixture of primary monoamines is hydrogenated tallow amine which contains predominantly hexadecyl- and octadecylamines with smaller amounts of tetradecylamine.

When the amine reacted with epichlorohydrin is an N-hydrocarbylalkylenediamine as defined, the polymeric reaction product is represented by subgeneric formula (B), In the reaction of epichlorohydrin with an N-aliphatic hydrocarbylalkylenediamine, it is believed (because of the known greater reactivity of primary amino hydrogen over secondary amino hydrogen) that the initially formed aminochlorohydrin is of the formula

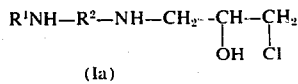

(Ia)

and the subsequently formed aminoepoxide is of the formula

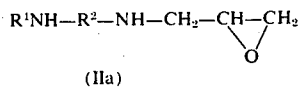

(IIa)

When IIa undergoes further condensation, the recurring units in the product may be

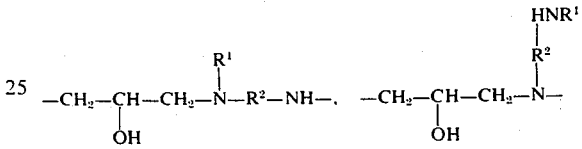

or both, since (IIa) contains two reactive secondary aminohydrogens. Thus, in subgeneric formula (B), above, $b$ is from 0 to 20, $c$ is from 0 to 20 and $b + c$ is from 2 to 20.

Illustrative examples of useful N-aliphatic hydrocarbyl alkylene diamines include N-octyl, N-nonyl, N-decyl, N-undecyl, N-dodecyl, N-tridecyl, N-tetradecyl, N-pentadecyl, N-hexadecyl, N-heptadecyl, N-octadecyl, N-nonadecyl, N-eicosyl, N-uneicosyl, N-docosyl, N-tricosyl, N-tetracosyl, as well as the corresponding N-alkenyl derivatives of ethylenediamine, propylenediamine, butylenediamine, pentylenediamine and hexylenediamine. The preferred N-aliphatic hydrocarbylalkylenediamine is N-aliphatic hydrocarbyl-1,3-propylenediamine. The N-aliphatic hydrocarbyl-1,3-propylenediamines are commercially available and are readily prepared from aliphatic primary monoamines such as those described above by cyanoethylation with acrylonitrile and hydrogenation of the cyanoethylated amine. Mixtures of N-aliphatic hydrocarbyl-1,3-propylenediamines can also be advantageously used. The preferred mixture is N-tallow-1,3-propylenediamine which is commercially available as "Duomeen T" wherein "tallow" represents predominantly mixtures of alkyl and alkenyl groups of 16 to 18 carbon atoms which can contain small amounts of alkyl

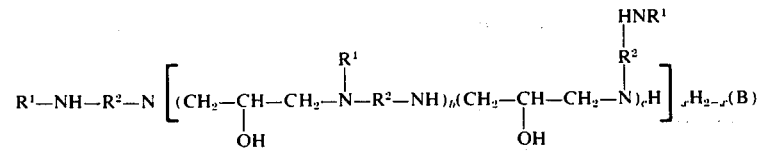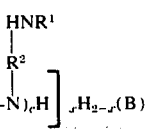

where $R^1$ is an aliphatic hydrocarbyl group of 8 to 24 carbon atoms, $R^2$ is an alkylene group of 2 to 6 carbon atoms, $b$ and $c$ are integers of 0 to 20 and $b + c$ is an integer of 2 to 20 and $x$ is 1 to 2.

and alkenyl groups of 14 carbon atoms.

The reaction between the amines (as defined) and epichlorohydrin is advantageously carried out in the presence of a solvent such as benzene, toluene or xylene which can also contain some hydroxylic component such as ethanol, propanol, butanol and the like.

After the initial reaction between the amine and epichlorohydrin to form an aminochlorohydrin intermediate as illustrated above by Products I and Ia, the reaction mass is treated with a strong inorganic base, such as sodium, potassium or lithium hydroxide, to form an aminoepoxide as represented by Products II and IIa above, which under continued heating undergoes polymerization to yield the desired product represented above by the generic formula nad subgenerics A and B. Inorganic chloride formed in the reaction is removed by filtration. The solvent used to facilitate the reaction can be removed if desired, e.g. by distillation, but generally it is more convenient to use the polymeric polyamine as a solution.

The above-described reactions of epichlorohydrin with amines to form polymeric products are well-known and find extensive use in epoxide resin technology (cf. "Epoxy Resins". Henry Lee and Kris Neville, The McGraw-Hill Book Co., 1957). The polymeric reaction products of epichlorohydrin and amines are complex mixtures but it is believed that the above formulas of the polymeric polyamines fairly represent the composition and structures that are obtained.

Polymeric polyamines as described above are commercially available. One such product which is believed to be a polymeric reaction product of N-tallow-1,3-propylenediamine with epichlorohydrin is "Polyflo 130" sold by Universal Oil Co. and is suitable for use in the present invention.

The normally liquid hydrocarbon fuels to which the additives are added to render such hydrocarbon fuels electrically conductive are those boiling in the range of about 20° to 375°C. and include such commonly designated fuels as aviation gasoline, motor gasoline, jet fuels, naphtha, kerosene, diesel fuel and distillate burner fuel oil. The additive composition can be added in any conventional manner. Each individual component of the composition can be added to the hydrocarbon fuel separately or the composition can be added as a simple mixture or as a solution in a solvent, such as benzene, toluene, xylene, isopropanol, cyclohexane, fuel oil, or in a mixture of such solvents. It is convenient to prepare both the polysulfone copolymer and the polymeric polyamine in a solvent, such as one or more of those mentioned above. Thus, it is preferred to use such solutions of polysulfone and polymeric polyamine and to combine them. The combination, which can be termed a concentrate, can then be added to the hydrocarbon fuel. Such concentrate conveniently contains from about 1 to 40% by weight of polysulfone copolymer, from about 1 to 40% by weight of polymeric polyamine and from about 20 to 98% by weight of a solvent or a mixture thereof as described. Preferably, the concentrate will contain from about 5 to 25% by weight of polysulfone copolymer, from about 5 to 25% by weight of polymeric polyamine and from about 50 to 90% by weight of solvent.

When formulating concentrates, it is preferred that the polymeric polyamine be present as a salt, particularly a sulfonic acid salt, for improved resistance to precipitate formation in storage. For example, when a concentrate as described comprising polymeric polyamine in the free base form is stored at elevated temperatures of about 44°C. for a period of time of about 4 weeks, a small amount of precipitate sometimes forms. The presence of small amounts of precipitate in the concentrates have little or no effect on the usefulness of the present compositions as antistatic additives but are undesirable if only from an aesthetic point of view. It has been found that strong acids such as hydrochloric, sulfuric or a sulfonic acid can be used to limit precipitate formation in the concentrates. Oil-soluble sulfonic acids are preferred because they effectively inhibit precipitate formation without substantial deleterious effect upon the electrical conductivity property of the composition. Any oil-soluble sulfonic acid such as an alkanesulfonic acid or an alkarylsulfonic acid can be used. A useful sulfonic acid is petroleum sulfonic acid resulting from treating oils with sulfuric acid.

Generally, the amount of sulfonic acid incorporated in the concentrate is an equivalent amount, that is, sufficient amount of sulfonic acid to neutralize all the amine groups of the polymeric polyamine, although lesser or greater than the equivalent amount can be used. Thus, the most preferred form of the concentrate of the present invention will contain from about 5 to 25% by weight of polysulfone copolymer, from about 5 to 25% by weight of polymeric polyamine, from about 5 to 30% by weight of, say, dodecylbenzenesulfonic acid, and from about 20 to 85% by weight of solvent.

When a three-component additive is employed (where a quaternary ammonium compound is the third component), the concentrate composition will comprise, based on total weight of the composition: from about 5 to 25% of polysulfone, from about 5 to 25% of polyamine, from about 0.5 to 5% of quaternary ammonium compound, from about 5 to 25% of a sulfonic acid, say, dodecylbenzene sulfonic acid, and from about 20 to 84.5% of solvent.

The utility of the present invention composition as a highly effective antistatic additive for hydrocarbon fuels is demonstrated by the fact that the incorporation into hydrocarbon fuels of as little as 0.00003% by weight (0.3 part per million, ppm) of polysulfone copolymer and 0.00002% by weight (0.2 ppm) of polymeric polyamine is sufficient, in nearly all hydrocarbon fuels investigated, to provide electrical conductives of at least 100 C.U. (conductivity units). In certain responsive fuels, as little as 0.0000018 weight % (0.018 ppm) polysulfone copolymer and 0.0000013 weight % (0.013 ppm) polymeric polyamine provide a conductivity of at least 100 C.U. Thus, the present invention provides a highly effective ashless antistatic additive composition which confers increased electrical conductivity to hydrocarbon fuels at very low usage levels.

The antistatic effectiveness of the present invention composition is unexpected since combinations of the polysulfone copolymers with various amines such as tallowamine, N-tallow-1,3-diaminopropane, tetraethylenepentamine, show decreased conductivity over the conductivity provided by the polysulfone copolymer itself.

The hydrocarbon fuels into which the present composition is incorporated exhibit satisfactory water interaction properties as evidenced by satisfactory results in the water separation test according to ASTM D-2250-66T. The hydrocarbon fuel composition containing the composition of the invention can also contain conventional additives used in hydrocarbon fuels such as antiknock compounds, antioxidants, corrosion inhibitors, metal deactivators, rust preventatives, dyes, antiicing agents and the like.

The following Examples are meant to illustrate the invention not to limit the invention.

PREPARATIONS A-1 to A-15 OF POLYSULFONE COPOLYMERS

Preparation A-1

A 3-liter resin flask equipped with a stirrer, a reflux condenser, a thermometer and a gas inlet tube was swept with dry nitrogen. To the flask was added 400 g. of 1-decene, 1430 g. of toluene and 2.8 g. of dodecyl mercaptan. The content of the flask was a solution which was cooled to between 5° and 10°C., and then 200 g. of sulfur dioxide was passed into the solution. Azobisisobutyronitrile, 2.8 g., was then added and a mercury arc lamp was used to irradiate the solution. The stirred charge was kept at from 5° to 15°C. with the sulfur dioxide being added continuously at such a rate that it was always in excess. At intervals of 4, 8, 12, and 16 hours additional 1.4 g. portions of azobisisobutyronitrile were added.

After a total of 20 hours of irradiation, the mercury lamp was turned off, the addition of sulfur dioxide was stopped, and nitrogen gas was passed into the viscous solution to remove excess sulfur dioxide. After the removal of the sulfur dioxide, a clear viscous solution weighing 1820 g. was obtained. A weighed portion of the solution was removed and upon removal of toluene and unreacted 1-decene by evaporation in a rotary vacuum evaporator, 1-decene polysulfone was obtained. The yield of 1-decene polysulfone based on the above-isolated polymer was 279 g. (82%). The 1-decene polysulfone had an inherent viscosity of 0.36 measured as a 0.5% solution in toluene at 30°C. The weight average molecular weight of the polymer as determined by the light-scattering method was 400,000.

Using the same procedure as described in Preparation A-1, other polysulfones were prepared. These polysulfones with their inherent viscosities are summarized in Table 1 below. The viscosities were measured in toluene (at 30°C.) as a 0.5% solution.

TABLE 1

| Preparation | Olefin Used | Inherent Viscosity |
|---|---|---|
| A-2 | 1-hexene | 0.97 |
| A-3 | 1-octene | 0.29 |
| A-4 | 1-octene | 0.45 |
| A-5 | 1-octene | 0.87 |
| A-6 | 1-decene | 0.14 |
| A-7 | 1-decene | 0.58 |
| A-8 | 1-decene | 0.90 |
| A-9 | 1-decene | 1.24 |
| A-10 | 1-decene | 1.40 |
| A-11 | 1-decene | 1.57 |
| A-12 | 1-dodecene | 0.39 |
| A-13 | 1-hexadecene | 0.86 |
| A-14 | 1-octene/octadecene (10/1) | 0.70 |
| A-15 | 1-decene/maleic anhydride (10/1) | 0.68 |

Preparation A-16

Into a 5-gallon autoclave, 2940 g. of 1-decene, 5250 g. of toluene, 59 g. of dodecyl mercaptan and 88 g. of "Lupersol" 11 (a 75% solution of t-butyl peroxypivalate in neutral mineral spirits) were charged. The autoclave was sealed, swept twice with nitrogen and evacuated. Sulfur dioxide, 1984 g., was then added to the autoclave. The reaction mixture was heated to 38° to 42°C. with agitation for 10 hours. The maximum pressure developed during the polymerization was 14 psig. The autoclave was cooled to room temperature and sparged with nitrogen to remove unreacted $SO_2$. The reaction mixture was filtered to provide 9150 g. of a clear, pale yellow, viscous solution containing 40% by weight of 1-decene polysulfone. The 1-decene polysulfone had an inherent viscosity of 0.17 measured as a 0.5% solution in toluene at 30°C. The addition of 1300 g. of isopropanol and 4215 g. of toluene to the above 40% solution provided a 25% solution of 1-decene polysulfone in the toluene/isopropanol solvent mixture.

PREPARATIONS B-1 TO B-3 OF POLYMERIC POLYAMINE

Preparation B-1

Into a reaction flask equipped with a stirrer, a reflux condenser, a thermometer, and an addition funnel 46.3 g. (0.5 mole) of epichlorohydrin, 100 ml. of xylene and 50 ml. of isopropanol were added. The mixture was heated to 55° to 60°C. and 64 g. (0.25 mole) of hydrogenated tallowamine in 80 ml. of xylene was added over a period of about 20 minutes. The reaction mixture was kept at 55° to 60°C. for 2.5 hours and then an additional 64 g. (0.25 mole) of hydrogenated tallowamine in 80 ml. of xylene was added. The temperature was then raised to 80°C. and the reaction mixture was kept at 80°C. for 2 hours. Sodium hydroxide (pellets), 10 g., were then added, and the temperature was raised to 88°C. After about 2 hours at 88°C., an additional 10 g. of sodium hydroxide (pellets) was added and the reaction continued for 1.5 hours. The reaction mixture was allowed to cool to room temperature and filtered to provide a yellow slightly viscous solution. Removal of the solvents at reduced pressures provided a yellow waxy polymeric polyamine which was free of tallowamine (as indicated by thin layer chromatography) and which showed the presence of hydroxyl groups (by infrared spectroscopy).

Preparation B-2

Into a reaction flask equipped with a stirrer, a reflux condenser, a thermometer and an addition funnel, and containing 110 g. (0.33 mole) of N-tallow-1,3-diaminopropane ("Duomeen T"), 110 ml. of xylene and 30 ml. of isopropanol heated at 55° to 60°C., was added 31 g. (0.33 mole) of epichlorohydrin in 75 ml. of xylene. The reaction mixture was kept at 55° to 60°C. for 1.5 hour. The temperature was then raised to 80°C. and held at 80°C. for 2.5 hours. Solid sodium hydroxide, 13.3 g., was then added, the temperature raised to 90°C. and kept at 90°C. for 2 hours. The reaction mixture was cooled to room temperature, and filtered to provide an amber solution. Removal of the solvents by distillation at reduced pressures provided polymeric polyamine as a viscous polymer.

Preparation B-3

Using the same procedure as described in Preparation B-2, polymeric polyamine was prepared from epichlorohydrin and N-tallow-1,3-diaminopropane wherein the molar ratio of epichlorohydrin to N-tallow-1,3-diaminopropane was 1.5:1.

EXAMPLES 1 TO 3 AND COMPARISONS

The compositions listed in Table 2 were then prepared. The polysulfone of the Table is 1-decene polysulfone of Preparation A-16. The solvent is toluene except that about 0.7% of isopropanol is also present therein when dicocomethylammonium nitrate is used.

It is noted that the N-tallow-1,3-diaminopropane of Comparisons 3 and 4 and the triethylenepentamine of Comparisons 5 and 6 are not the polymeric polyamines of this invention composition.

Treated hydrocarbon fuels whose conductivity values exceeded the maximum reading on the dial (1000 C.U.) are indicated as having conductivity units of 1000+ in Table 3 which summarizes the results of con-

TABLE 2

| Composition | Polysulfone Wt. % | Dicocodimethyl-ammonium nitrite Wt. % | Polyamine Wt. % | Solvent Wt. % |
|---|---|---|---|---|
| Comparison 1 | 25 | — | None | 75 |
| Comparison 2 | 24.0 | 2.7 | None | 73.3 |
| Comparison 3 | 20.3 | — | N-tallow-1,3-diaminopropane 18.7 | 61 |
| Comparison 4 | 19.5 | 2.2 | N-tallow-1,3-diaminopropane 18.7 | 59.6 |
| Comparison 5 | 22.3 | — | Triethylenepentamine 10.7 | 67 |
| Comparison 6 | 21.4 | 2.4 | Triethylenepentamine 10.7 | 65.5 |
| Example 1 | 19.5 | 2.2 | Preparation B-1 18.7 | 59.6 |
| Example 2 | 21.4 | 2.4 | Preparation B-2 10.7 | 65.5 |
| Example 3 | 21.4 | 2.4 | Preparation B-3 10.7 | 65.5 |

The compositions of Table 2 were added to a clayfiltered virgin light gas oil (VLGO) and a clay-filtered jet fuel (JP-5). It will be noted that their addition at the one pound per thousand barrels level provides polysulfone copolymer in the range of from about 0.00008 to 0.0001 weight percent (0.8 to 1 ppm) and the polyamine in the range of from about 0.00004 to 0.00008 weight percent (0.4 to 0.8 ppm). It is noted that one pound of active ingredient per 1000 barrels of hydrocarbon fuel is equivalent to 0.0004 weight percent, i.e. 4 ppm. The barrel designation applies to a container holding 42 U.S. gallons.

The untreated clay-filtered hydrocarbon fuels had conductivities in the range of 0 to 5 conductivity units. All conductivity measurements were made at 70°F. (21.1°C.) with a Maihak Conductivity Indicator (H. Maihak A.G., Hamburg, Germany). In operation, the device imposes a potential of 6 volts of direct current on a pair of chromium plated electrodes immersed in the fluid to be tested. The current resulting from this potential, which is of the order of $10^{-9}$ to $10^{-8}$ ampere, is amplified and used to actuate a dial calibrated in conductivity units. A conductivity unit (C.U.) is 1 picomho/meter.

ductivity measurements made on the compositions given in Table 2.

TABLE 3

| | | Conductivity (C.U. at 70°F) | |
|---|---|---|---|
| Composition | lb./1000 bls. | Clay-Filtered VLGO | Clay-Filtered JP-5 |
| Comparison 1 | 0.5 | 35 | 50 |
| Comparison 2 | 0.5 | 35 | 50 |
| Comparison 3 | 0.65 | 10 | 10 |
| Comparison 4 | 0.65 | 10 | 10 |
| Comparison 5 | 0.57 | 10 | 10 |
| Comparison 6 | 0.57 | 10 | 10 |
| Example 1 | 0.33 | 185 | 260 |
| | 0.65 | 240 | 470 |
| | 1.3 | 390 | 700 |
| | 2.6 | 570 | 1000+ |
| Example 2 | 0.29 | 75 | 190 |
| | 0.58 | 155 | 350 |
| | 1.16 | 240 | 600 |
| | 2.3 | 415 | 1000+ |
| Example 3 | 0.29 | 190 | 450 |
| | 0.58 | 295 | 770 |
| | 1.16 | 500 | 1000+ |
| | 2.3 | 830 | 1000+ |

The above results show that the addition to polysulfone (Comparison Composition 1) or polysulfone containing a quaternary ammonium compound (Comparison Composition 2) of N-tallow-1,3-diaminopropane (Comparison Compositions 3 and 4) or of tetraethylenepentamine (Comparison Compositions 5 and 6) not only does not increase the conductivity but actually decreases the conductivity. In contrast, compositions of the present invention (Examples 1, 2 and 3) effect very marked increases in the electrical conductivity. Similar synergistic responses are obtained with all combinations of the polysulfone copolymers of Preparations A-1 to A-16 with the polymeric polyamines of Preparations B-1 to B-3.

EXAMPLES 4 TO 8 AND COMPARISONS

The compositions of Table 4 were prepared and evaluated for storage stability. The storage stability test is carried out by storing the compositions at 43.3°C. for 4 weeks and visually noting the presence or absence of precipitates. It can be seen that both hydrochloric acid and sulfonic acid effectively pervent precipitate formation.

TABLE 4

| Compositions | Polysulfone[1] Wt. % | Dicocodimethyl-ammonium nitrite Wt. % | Polymeric[2] Polyamine Wt. % | Acid Wt. % | Solvent[3] Formation | Storage Stability Precipitate |
|---|---|---|---|---|---|---|
| Comparison | 25 | — | — | — | 75 | Absent |
| Comparison 2 | 24 | 2.7 | — | — | 73.3 | Absent |
| Example 4 | 18.8 | — | 12.5 | — | 68.7 | Present |
| Example 5 | 18.0 | 2.0 | 12.5 | — | 67.5 | Present |
| Example 6 | 17.7 | 2. | 12.3 | hydrogen chloride 1.7 | 66.3 | Absent |
| Example 7 | 14.4 | 1.6 | 10 | petroleum[4] sulfonic acid 10 | 64 | Absent |
| Example 8 | 15.6 | 1.8 | 10.8 | dodecylbenzene-sulfonic acid 13.5 | 58.3 | Absent |

[1] 1-Decene polysulfone of Example A-16.
[2] On 100% basis from "Polyflo 130" (Universal Oil Co.) which is believed to be a 50% solution in aromatic hydrocarbon solvent of polymeric condensation product of N-tallow-1,3-diaminopropane and epichlorohydrin.
[3] Primarily toluene with less than 1% isopropanol when quaternary salt is present.
[4] "Bryton Sulfonic Acid 90".

Conductivity measurements of hydrocarbon fuels containing the compositions of Comparison 2 and Examples 6 and 7 are summarized in Table 5. The hydrocarbon fuels used were the clay-filtered virgin light gas oil and JP-5 jet fuel previously described. Conductivity measurements were carried out as heretofore described. The results show that the composition of Example 7 is superior to that of Example 6 in maintaining the improved electrical conductivity that is obtained (compared to that obtained using the non-invention composition of Comparison 2).

TABLE 5

| Composition | lb./1000 bls. | Conductivity, C.U. at 70°F Clay-Filtered VLGO | Clay-Filtered JP-5 |
|---|---|---|---|
| Comparison 2 | 0.25 | 25 | 35 |
|  | 0.5 | 35 | 50 |
|  | 1.0 | 40 | 90 |
|  | 2.0 | 50 | 160 |
| Example 6 | 0.25 | 30 | 75 |
|  | 0.5 | 45 | 135 |
|  | 1.0 | 70 | 200 |
|  | 2.0 | 110 | 335 |
| Example 7 | 0.25 | 90 | 315 |
|  | 0.5 | 190 | 475 |
|  | 1.0 | 360 | 920 |
|  | 2.0 | 720 | 1000+ |

The results of Table 5 show that the combination containing the sulfonic acid (Example 7) is superior in maintaining the electrical conductivity of hydrocarbon fuels.

EXAMPLES 9 TO 13 AND COMPARISONS

Conductivity measurements of present invention compositions in 13 different hydrocarbon fuels are summarized in Table 6 below. Conductivity measurements with comparison compositions are also included. The following comparison compositions were used:

Comparison Composition 7 is a commercially used antistatic additive composition believed to be a 50 percent solution in hydrocarbon solvents of a mixture of chromium salts of mono- and dialkylsalicyclic acids, calcium dodecylsulfosuccinate and a basic polymer;

Comparison Composition 8 is a commercial fuel oil additive "Polyflo 130" which is believed to be a 50 percent solution in aromatic hydrocarbon solvents of a polymeric condensation product of N-tallow-1,3-diaminopropane and epichlorohydrin;

Comparison Composition 9 is a 24 percent solution of 1-decene polysulfone of Example A-16 and 2.7 percent solution of dicocodimethylammonium nitrite in toluene.

The following invention compositions were used:

Example 9 which contained 18.7 percent 1-decene polysulfone of Preparation A-16, 2.0 percent dicocodimethylammonium nitrite and 12.5 percent polymeric polyamine of Preparation B-3 in toluene;

Example 10 which contained 18.7 percent 1-decene polysulfone of Preparation A-16 and 12.5 percent polymeric polyamine in the form of "Polyflo 130" in aromatic hydrocarbon solvent which was about 90% toluene;

Example 11 which contained 18.5 percent 1-decene polysulfone of Preparation A-16, 2.1 percent dicocodimethylammonium nitrite and 12.5 percent polymeric polyamine in the form of "Polyflo 130" in aromatic solvents which was about 90% toluene;

Example 12 which contained 14.4 percent 1-decene polysulfone of Preparation A-16, 1.6 percent dicocodimethylammonium nitrite, 10 percent polymeric polyamine in the form of "Polyflo 130" percent petroleum sulfonic acid ("Bryton Sulfonic Acid 90") in aromatic solvent which was about 90% toluene;

Example 13 which contained 15.6 percent 1-decene polysulfone of Preparation A-16, 1.8 percent dicocodimethylammonium nitrite, 10.8 percent polymeric polyamine in the form of "Polyflo 130", 13.5 percent dodecylbenzenesulfonic acid in aromatic solvent which was about 90% toluene.

At a 1 pound per 1000 barrels level in hydrocarbon fuels, the compositions of Examples 9-11 provide about 0.00007% (0.7 ppm) polysulfone copolymer and about 0.00003% (0.3 ppm) polymeric polyamine, and the compositions of Examples 12–13 provide about 0.00006% (0.6 ppm) polysulfone and 0.00004% (0.4 ppm) of polymeric polyamine.

Conductivity measurements were carried out at 70°F. with the Maihak Conductivity Indicator as described previously. Treated hydrocarbon fuels whose conductivity values exceeded the maximum reading on the dial (1000 C.U.) are indicated as having conductivity units (C.U.) of 1000+.

TABLE 6

| Composition | Min. lb./1000 bls. For 100 C.U. | Conductivity, C.U. at 70°C Lb./1000 Bls. | | | | | |
|---|---|---|---|---|---|---|---|
| | | 0.05 | 0.10 | 0.25 | 0.50 | 1.0 | 2.0 |
| Fuel 1: Clay-Filtered JP-5 | | | | | | | |
| Comparison 7 | 0.25 | 20 | 40 | 100 | 190 | 360 | 600 |
| Comparison 8 | 0.75 | 10 | 15 | 40 | 70 | 120 | 170 |
| Comparison 9 | 0.50 | 20 | 30 | 70 | 100 | 130 | 190 |
| Example 9 | 0.05 | 100 | 190 | 430 | 800 | 1000+ | 1000+ |
| Example 10 | 0.08 | 50 | 140 | 320 | 610 | 1000+ | 1000+ |
| Example 11 | 0.05 | 100 | 260 | 600 | 1000+ | 1000+ | 1000+ |
| Example 12 | 0.07 | 75 | 130 | 275 | 700 | 1000+ | 1000+ |
| Example 13 | 0.05 | 100 | 180 | 470 | 880 | 1000+ | 1000+ |
| Fuel 2: Clay-Filtered Isopar M | | | | | | | |
| Comparison 7 | 0.25 | 20 | 40 | 100 | 200 | 400 | 800 |
| Comparison 9 | 1.75 | 5 | 10 | 20 | 35 | 55 | 120 |
| Example 10 | 0.10 | 50 | 100 | 300 | 580 | 1000+ | 1000+ |
| Example 11 | 0.15 | 30 | 70 | 160 | 280 | 530 | 960 |
| Example 12 | 0.15 | 40 | 80 | 190 | 310 | 600 | 920 |
| Example 13 | 0.08 | 60 | 120 | 270 | 450 | 800 | 1000+ |
| Fuel 3: Clay-Filtered JP-4 | | | | | | | |
| Comparison 7 | 0.08 | 60 | 130 | 300 | 600 | 1000+ | 1000+ |
| Comparison 9 | 0.45 | 20 | 30 | 55 | 110 | 195 | 360 |
| Example 12 | 0.03 | 160 | 280 | 650 | 1000+ | 1000+ | 1000+ |
| Example 13 | 0.03 | 160 | 280 | 640 | 1000+ | 1000+ | 1000+ |
| Fuel 4: Clay-Filtered Jet A | | | | | | | |
| Comparison 7 | 0.15 | 30 | 70 | 180 | 350 | 650 | 1000+ |
| Comparison 9 | 0.85 | 10 | 20 | 40 | 70 | 115 | 170 |
| Example 12 | 0.08 | 70 | 130 | 300 | 550 | 1000+ | 1000+ |
| Example 13 | 0.05 | 100 | 170 | 340 | 630 | 1000+ | 1000+ |
| Fuel 5: Clay-Filtered No. 2 Fuel Oil | | | | | | | |
| Comparison 7 | 0.45 | 15 | 30 | 60 | 120 | 190 | 330 |
| Comparison 9 | 3.0 | 5 | 10 | 10 | 15 | 25 | 40 |
| Example 11 | 0.13 | 40 | 90 | 110 | 390 | 730 | 1000+ |
| Example 12 | 0.17 | 40 | 70 | 145 | 280 | 445 | 950 |
| Example 13 | 0.15 | 40 | 80 | 170 | 350 | 720 | 1000+ |
| Fuel 6: No. 2 Fuel Oil | | | | | | | |
| Comparison 7 | 0.50 | 10 | 25 | 50 | 100 | 175 | 330 |
| Comparison 8 | 0.90 | 5 | 10 | 35 | 60 | 110 | 195 |
| Comparison 9 | 1.0 | 20 | 35 | 60 | 70 | 100 | 130 |
| Example 10 | 0.35 | 10 | 30 | 80 | 160 | 380 | 830 |
| Example 11 | 0.30 | 20 | 40 | 90 | 180 | 420 | 970 |
| Example 12 | 0.50 | 15 | 25 | 65 | 110 | 220 | 550 |
| Example 13 | 0.45 | 15 | 25 | 75 | 115 | 230 | 440 |
| Fuel 7: No. 2 Fuel Oil | | | | | | | |
| Comparison 7 | 0.70 | 10 | 20 | 50 | 80 | 130 | 250 |
| Comparison 9 | 0.45 | 20 | 40 | 70 | 110 | 130 | 160 |
| Example 10 | 0.08 | 70 | 120 | 210 | 330 | 520 | 850 |
| Example 11 | 0.12 | 30 | 80 | 210 | 430 | 860 | 1000+ |
| Example 12 | 0.35 | 20 | 35 | 85 | 170 | 300 | 560 |
| Example 13 | 0.35 | 20 | 35 | 80 | 150 | 310 | 550 |
| Fuel 8: No. 2 Fuel Oil | | | | | | | |
| Comparison 7 | 0.55 | 20 | 30 | 60 | 90 | 170 | 310 |
| Comparison 9 | 1.0 | 20 | 30 | 50 | 70 | 100 | 130 |
| Example 12 | 0.30 | 20 | 40 | 90 | 175 | 280 | 650 |
| Example 13 | 0.20 | 30 | 60 | 175 | 235 | 420 | 830 |
| Fuel 9: No. 2 Fuel Oil | | | | | | | |
| comparison 7 | 0.40 | 10 | 30 | 70 | 120 | 250 | 490 |
| Comparison 9 | 1.60 | 10 | 20 | 30 | 50 | 70 | 110 |
| Example 9 | 0.20 | 50 | 70 | 130 | 280 | 540 | 970 |
| Example 10 | 0.15 | 30 | 60 | 130 | 260 | 660 | 1000+ |
| Example 11 | 0.15 | 30 | 70 | 150 | 290 | 580 | 1000+ |
| Fuel 10: No. 2 Fuel Oil | | | | | | | |
| Comparison 7 | 1.0 | 10 | 30 | 40 | 60 | 100 | 160 |
| Comparison 9 | 0.6 | 20 | 30 | 70 | 90 | 120 | 150 |
| Example 9 | 0.25 | 40 | 50 | 100 | 170 | 350 | 860 |
| Example 10 | 0.45 | 10 | 30 | 70 | 110 | 200 | 370 |
| Example 11 | 0.30 | 20 | 40 | 90 | 160 | 300 | 520 |
| Fuel 11: No. 2 Fuel Oil | | | | | | | |
| Comparison 7 | 0.5 | 10 | 20 | 50 | 100 | 210 | 390 |
| Comparison 9 | 0.5 | 30 | 50 | 80 | 100 | 120 | 145 |
| Example 12 | 0.20 | 30 | 60 | 110 | 235 | 425 | 780 |
| Example 13 | 0.25 | 30 | 50 | 90 | 210 | 390 | 720 |
| Fuel 12: No. 2 Fuel Oil | | | | | | | |
| Comparison 7 | 0.5 | 20 | 40 | 65 | 100 | 150 | 285 |
| Comparison 9 | 0.35 | 20 | 40 | 85 | 125 | 180 | 240 |
| Example 12 | 0.25 | 20 | 40 | 100 | 180 | 330 | 600 |
| Fuel 13: Clay-Filtered Virgin Light Gas Oil | | | | | | | |
| Comparison 7 | 1.3 | 10 | 20 | 30 | 50 | 70 | 140 |

TABLE 6-continued

| Composition | Min. lb./1000 bls. For 100 C.U. | Conductivity, C.U. at 70°C Lb./1000 Bls. | | | | | |
|---|---|---|---|---|---|---|---|
| | | 0.05 | 0.10 | 0.25 | 0.50 | 1.0 | 2.0 |
| Comparison 9 | 3.0 | 10 | 20 | 30 | 50 | 60 | 75 |
| Example 9 | 0.10 | 50 | 100 | 190 | 340 | 560 | 970 |
| Example 10 | 0.40 | 10 | 20 | 60 | 140 | 320 | 630 |
| Example 11 | 0.30 | 20 | 40 | 90 | 160 | 300 | 580 |
| Example 12 | 0.30 | 20 | 40 | 90 | 155 | 350 | 660 |
| Example 13 | 0.15 | 50 | 70 | 180 | 260 | 430 | 790 |

The above results show that the invention compositions foster outstanding antistatic properties in all of the hydrocarbon fuels investigated. It will be noted tha even in a most unresponsive fuel (Fuel 6) as little as 0.5 lb. per 1000 barrels of the composition of Example 12, which provides polysulfone copolymer of about 0.3 ppm and polymeric polysulfone of about 0.2 ppm, is sufficient to provide an electrical conductivity of 100 conductivity units. In all cases, the use of any of the invention compositions at 0.5 lb./1000 barrels or less is sufficient to provide a conductivity of at least 100 conductivity units. The results also show that the conductivities provided by the combination of polysulfone copolymer and polymeric polyamine are considerably in excess of those expected from the conductivities of polysulfone copolymer and polymeric polyamine alone.

The embodiments of the invention in which an exclusive property or privilege is claimed are defined as follows:

1. In an antistatic additive composition for hydrocarbon fuels comprising two components present in a weight ratio of 100:1 to 1:100, wherein one component is a polysulfone copolymer consisting essentially of about 50 mol percent of units from sulfur dioxide, about 40 to 50 mol percent of units derived from one or more 1-alkenes each having from about 6 to 24 carbon atoms, and from about 0 to 10 mol percent of units derived from an olefinic compound having the formula ACH=CHB wherein A is a group having the formula —C$_x$H$_{2x}$)—COOH wherein $x$ is from 0 to about 17, and B is hydrogen or carboxyl, with the proviso that when B is carboxyl, $x$ is 0, and wherein A and B together can be a dicarboxylic anhydride group, the improvement which comprises, in combination with said polysulfone component,
a polymeric polyamine of the formula

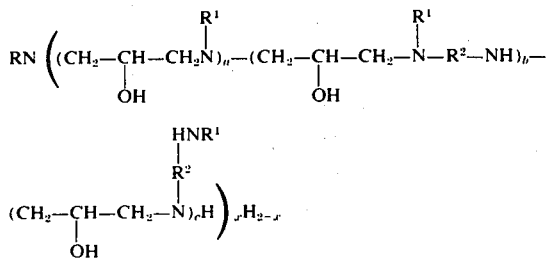

wherein
R$^1$ is an aliphatic hydrocarbyl group of 8 to 24 carbon atoms,
R$^2$ is an alkylene group of 2 to 6 carbon atoms,
R is R$^1$, or, an N- aliphatic hydrocarbyl alkylene group of the formula R$^1$NHR$^2$,
$a$ is an integer of 0 to 20,
$b$ is an integer of 0 to 20,
$c$ is an integer of 0 to 20, and
$x$ is an integer of 1 to 2,
with the proviso that when R is R$^1$ then $a$ is an integer of 2 to 20 and $b=c=o$, and when R is R$^1$NH—R$^2$ then $a$ is 0 and $b + c$ is an integer of 2 to 20.

2. A composition according to claim 1 wherein the polysulfone copoylmer consists essentially of about 50 mol percent of units derived from sulfur dioxide and about 50 mol percent of units derived from at least 1-alkene having from 8 to 12 carbon atoms.

3. A composition according to claim 2 wherein the 1-alkene is 1-decene.

4. A composition according to claim 1 wherein R in the polyamine component is equal to R$^1$ and R$^1$ is an aliphatic hydrocarbyl group of 12 to 18 carbon atoms.

5. A composition according to claim 4 wherein R$^1$ is the aliphatic hydrocarbyl group of tallowamine.

6. A composition according to claim 1 where R in the polyamine is R$^1$NHR$^2$, wherein R$^1$ is an aliphatic hydrocarbyl group of 12 to 18 carbon atoms and R$^2$ is an alkylene group of 3 carbon atoms.

7. A composition according to claim 6 wherein R$^1$ is the aliphatic hydrocarbyl group of tallowamine.

8. A composition comprising, based on total weight,
i. from about 5 to 25 percent of polysulfone,
ii. from about 5 to 25 percent of polymeric polyamine, and
iii. from about 50 to 90 percent of solvent,
the polysulfone of (i) consisting essentially of about 50 mole percent of units from sulfur dioxide, about 40 to 50 mol percent of units derived from one or more 1-alkenes each having from about 6 to 24 carbon atoms, and from about 0 to 10 mol percent of units derived from an olefinic compound having the formula ACH=CHB wherein A is a group having the formula —C$_x$H$_{2x}$)—COOH wherein $x$ is from 0 to about 17, and B is hydrogen or carboxyl, with the proviso that when B is carboxyl, $x$ is 0, and wherein A and B together can be a dicarboxylic anhydride group,
the polymeric polyamine of (ii) having the formula

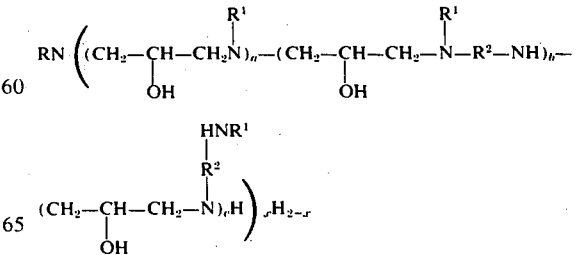

wherein

R¹ is an aliphatic hydrocarbyl group of 8 to 24 carbon atoms,

R² is an alkylene group of 2 to 6 carbon atoms,

R is R¹, or, an N- aliphatic hydrocarbyl akylene group of the formula R¹NHR², a is an integer of 0 to 20, b is an integer of 0 to 20, c is an integer of 0 to 20, and x is an integer of 1 to 2, with the proviso that when R is R¹ then a is an integer of 2 to 20 and $b=c=o=$, when R is R¹NH—R² then a is 0 and b + c is an integer of 2 to 20, and the solvent of (iii) being selected from the group consisting of benzene, toluene, xylene, isopropanol, cyclohexane, fuel oil and mixtures thereof.

9. A composition comprising, based on total weight, i. from about 5 to 25 percent of polysulfone, ii. from about 5 to 25 percent of polymeric polyamine, iii. from about 5 to 30 percent of oil-soluble sulfonic acid, and iv. from about 20 to 85 percent of solvent, the polysulfone of (i) consisting essentially of about 50 mol percent of units from sulfur dioxide, about 40 to 50 mol percent of units derived from one or more 1-alkenes each having from about 6 to 24 carbon atoms, and from about 0 to 10 mol percent of units derived from an olefinic compound having the formula ACH=CHB wherein A is a group having the formula $—C_xH_{2x}—$COOH wherein x is from 0 to about 17, and B is hydrogen or carboxyl, with the proviso that when B is carboxyl, x is 0, and wherein A and B together can be a dicarboxylic anhydride group, the polymeric polyamine of (ii) having the formula

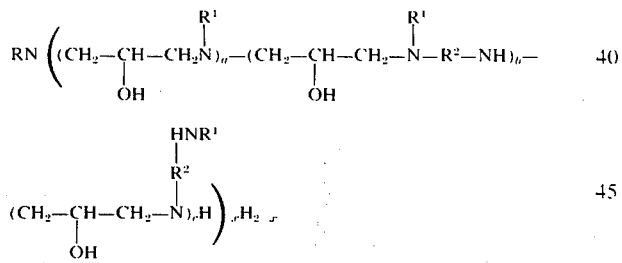

wherein

R¹ is an aliphatic hydrocarbyl group of 8 to 24 carbon atoms,

R² is an alkylene group of 2 to 6 carbon atoms,

R is R¹, or, an N- aliphatic hydrocarbyl akylene group of the formula R¹NHR², a is an integer of 0 to 20, b is an integer of 0 to 20, c is an integer of 0 to 20, and x is an integer of 1 to 2, with the proviso that when R is R¹ then a is an integer of 2 to 20 and $b=c=o=$, and when R is R¹NH—R² than a is 0 and b + c is an integer of 2 to 20, the oil-soluble sulfonic acid of (iii) being dodecylbenzenesulfonic acid, and the solvent of (iv) being selected from the group consisting of benzene, toluene, xylene, isopropanol, cyclohexane, fuel oil and mixtures thereof.

10. A hydrocarbon fuel boiling in the range of from about 20° to 375°C. containing from about 0.01 ppm to 40 ppm of the composition defined in claim 1.

11. In an antistatic additive composition for hydrocarbon fuels comprising a polysulfone copolymer consisting essentially of about 50 mol percent of units derived from sulfur dioxide, from about 40 to 50 mol percent of units derived from 1-alkene of 6 to 24 carbon atoms and from 0 to about 10 mol percent of units derived from an olefin having the formula, ACH=CHB, wherein A is a group having the formula $—(C_xH_{2x}—)$—COOH wherein x is from 0 to about 17, and B is hydrogen or carboxyl, with the proviso that when B is carboxyl, x is 0, and wherein A and B together can be a dicarboxylic anhydride group, and a quaternary ammonium compound having the formula:

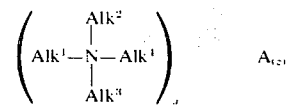

wherein

Alk¹ and Alk² are the same or different alkyl groups having from 1 to 22 carbon atoms, Alk³ is selected from the group consisting of alkyl groups of 1 to 22 carbon atoms and

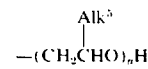

where

Alk⁵ is hydrogen or methyl and n is 1 to 20,

Alk⁴ is selected from the group consisting of (a) an alkyl group having 1 to 22 carbon atoms, (b) an aralkyl group having from 7 to 22 carbon atoms, (c) a

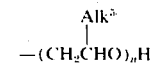

group as defined above, (d) a

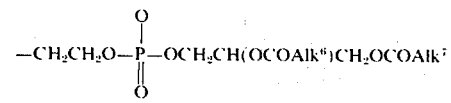

group wherein

Alk⁶ and Alk⁷ are the same or different alkyl groups having from 11 to 19 carbon atoms, and (e) an —Alk⁸—CO₂ group wherein Alk⁸ is a hydrocarbyl group having from 1 to 17 carbon atoms, with the proviso that when Alk¹, Alk², Alk³ and Alk⁴ are each alkyl groups, at least one of them is an alkyl group having at least 8 carbon atoms, A is an anion, z is 0 or 1, z is 0 when Alk⁴ is (d) or (e), and y is at least 1, y is equal to the ionic valence of anion A when z is 1, the improvement which comprises, in combination therewith, a polymeric polyamine of the formula $$RN\left((CH_2-CH-CH_2N)_a-(CH_2-CH-CH_2-N-R^2-NH)_b-\right.$$
$$\left.\quad\quad\quad\quad\; |\quad\quad\quad\quad\quad\quad\; |\right.$$
$$\left.\quad\quad\quad\quad OH\quad\quad\quad\quad\quad OH\right.$$

$$\left.\quad\quad\quad\quad\quad\quad\quad\quad\quad\quad HNR^1\right.$$
$$\left.\quad\quad\quad\quad\quad\quad\quad\quad\quad\quad\; |\right.$$
$$\left.\quad\quad\quad\quad\quad\quad\quad\quad\quad\quad R^2\right.$$
$$\left.(CH_2-CH-CH_2-N)_cH\right)_xH_{2-x}$$
$$\quad\quad\; |$$
$$\quad\quad OH$$

wherein
- $R^1$ is an aliphatic hydrocarbyl group of 8 to 24 carbon atoms,
- $R^2$ is an alkylene group of 2 to 6 carbon atoms,
- R is $R^1$, or, an N- aliphatic hydrocarbyl alkylene group of the formula $R^1NHR^2$,
- $a$ is an integer of 0 to 20,
- $b$ is an integer of 0 to 20,
- $c$ is an integer of 0 to 20, and
- $x$ is an integer of 1 to 2,
- with the proviso that when R is $R^1$ then a is an integer of 2 to 20 and $b=c=o$, and when R is $R^1NH-R^2$ then $a$ is 0 and $b + c$ is an integer of 2 to 20;
- the components being present in the ratio of from 0.01 to 100 parts of each of the polyamine and quaternary ammonium compound for each part of polysulfone.

12. A hydrocarbon fuel boiling in the range of from about 20° to 375°C. containing from about 0.01 ppm to 40 ppm of the composition defined in claim 11.

13. A composition comprising, based on total weight,
i. from about 5 to 25 percent of polysulfone,
ii. from about 5 to 25 percent of polyamine,
iii. from about 0.5 to 5 percent of quaternary ammonium compound,
iv. from about 5 to 25 percent of oil-soluble sulfonic acid, and
v. from about 20 to 84.5 percent of solvent,
the polysulfone of (i) consisting essentially of about 50 mol percent of units derived from sulfur dioxide, from about 40 to 50 mol percent of units derived from 1-alkene of 6 to 24 carbon atoms and from 0 to about 10 mol percent of units derived from an olefin having the formula, ACH=CHB, wherein A is a group having the formula $-(C_xH_{2x}-)-COOH$ wherein $x$ is from 0 to about 17, and B is hydrogen or carboxyl, with the proviso that when B is carboxyl, $x$ is 0, and wherein A and B together can be a dicarboxylic anhydride group,
the polyamine of (ii) having the formula $$RN\left((CH_2-CH-CH_2N)_a-(CH_2-CH-CH_2-N-R^2-NH)_b-\right.$$
$$\left.\quad\quad\quad\quad\; |\quad\quad\quad\quad\quad\quad\; |\right.$$
$$\left.\quad\quad\quad\quad OH\quad\quad\quad\quad\quad OH\right.$$
$$\left.\quad\quad\quad\quad\quad\quad\quad\quad\quad\quad HNR^1\right.$$
$$\left.\quad\quad\quad\quad\quad\quad\quad\quad\quad\quad\; |\right.$$
$$\left.\quad\quad\quad\quad\quad\quad\quad\quad\quad\quad R^2\right.$$
$$\left.(CH_2-CH-CH_2-N)_cH\right)_xH_{2-x}$$
$$\quad\quad\; |$$
$$\quad\quad OH$$

wherein
- $R^1$ is an aliphatic hydrocarbyl group of 8 to 24 carbon atoms,
- $R^2$ is an alkylene group of 2 to 6 carbon atoms,
- R is $R^1$, or, an N- aliphatic hydrocarbyl alkylene group of the formula $R^1NHR^2$,
- $a$ is an integer of 0 to 20,
- $b$ is an integer of 0 to 20,
- $c$ is an integer of 0 to 20, and
- $x$ is an integer of 1 to 2,
- with the proviso that when R is $R^1$ then a is an integer of 2 to 20 and $b=c=o$, and when R is $R^1NH-R^2$ then $a$ is 0 and $b + c$ is an integer of 2 to 20, the quaternary ammonium compound of (iii) having the formula $$\left(\begin{array}{c}Alk^2\\|\\Alk^1-N-Alk^4\\|\\Alk^3\end{array}\right)_y A_{(z)}$$

wherein
- $Alk^1$ and $Alk^2$ are the same or different alkyl groups having from 1 to 22 carbon atoms,
- $Alk^3$ is selected from the group consisting of alkyl groups of 1 to 22 carbon atoms and $$\begin{array}{c}Alk^5\\|\\-(CH_2CHO)_nH\end{array}$$

where $Alk^5$ is hydrogen or methyl and $n$ is 1 to 20,
$Alk^4$ is selected from the group consisting of (a) an alkyl group having 1 to 22 carbon atoms, (b) an aralkyl group having from 7 to 22 carbon atoms, (c) a $$\begin{array}{c}Alk^5\\|\\-(CH_2CHO)_nH\end{array}$$

group as defined above, (d) a $$-CH_2CH_2O-\overset{O}{\underset{\|}{P}}-OCH_2CH(OCOAlk^6)CH_2OCOAlk^7$$

group wherein
$Alk^6$ and $Alk^7$ are the same or different alkyl groups having from 11 to 19 carbon atoms, and (e) an $-Alk^8-CO_2$ group wherein $Alk^8$ is a hydrocarbyl group having from 1 to 17 carbon atoms, with the proviso that when $Alk^1$, $Alk^2$, $Alk^3$ and $Alk^4$ are each alkyl groups, at least one of them is an alkyl group having at least 8 carbon atoms,
A is an anion,
$z$ is 0 or 1, $z$ is 0 when $Alk^4$ is (d) or (e), and
$y$ is at least 1, $y$ is equal to the ionic valence of anion A when $z$ is 1, the improvement which comprises, in combination therewith,
the oil-soluble sulfonic acid of (iv) being dodecylbenzenesulfonic acid, and
the solvent of (v) being selected from the group consisting of benzene, toluene, xylene, isopropanol, cyclohexane, fuel oil and mixtures thereof.

14. A composition according to claim 13, wherein the quaternary ammonium compound is dicocodimethyl ammonium nitrite.

* * * * *